W. MICHALCZYK.
BORING TOOL.
APPLICATION FILED APR. 4, 1921.

1,436,974.

Patented Nov. 28, 1922.
2 SHEETS—SHEET 1.

Inventor
WLADYSLAW MICHALCZYK

By [signature]
Attorney

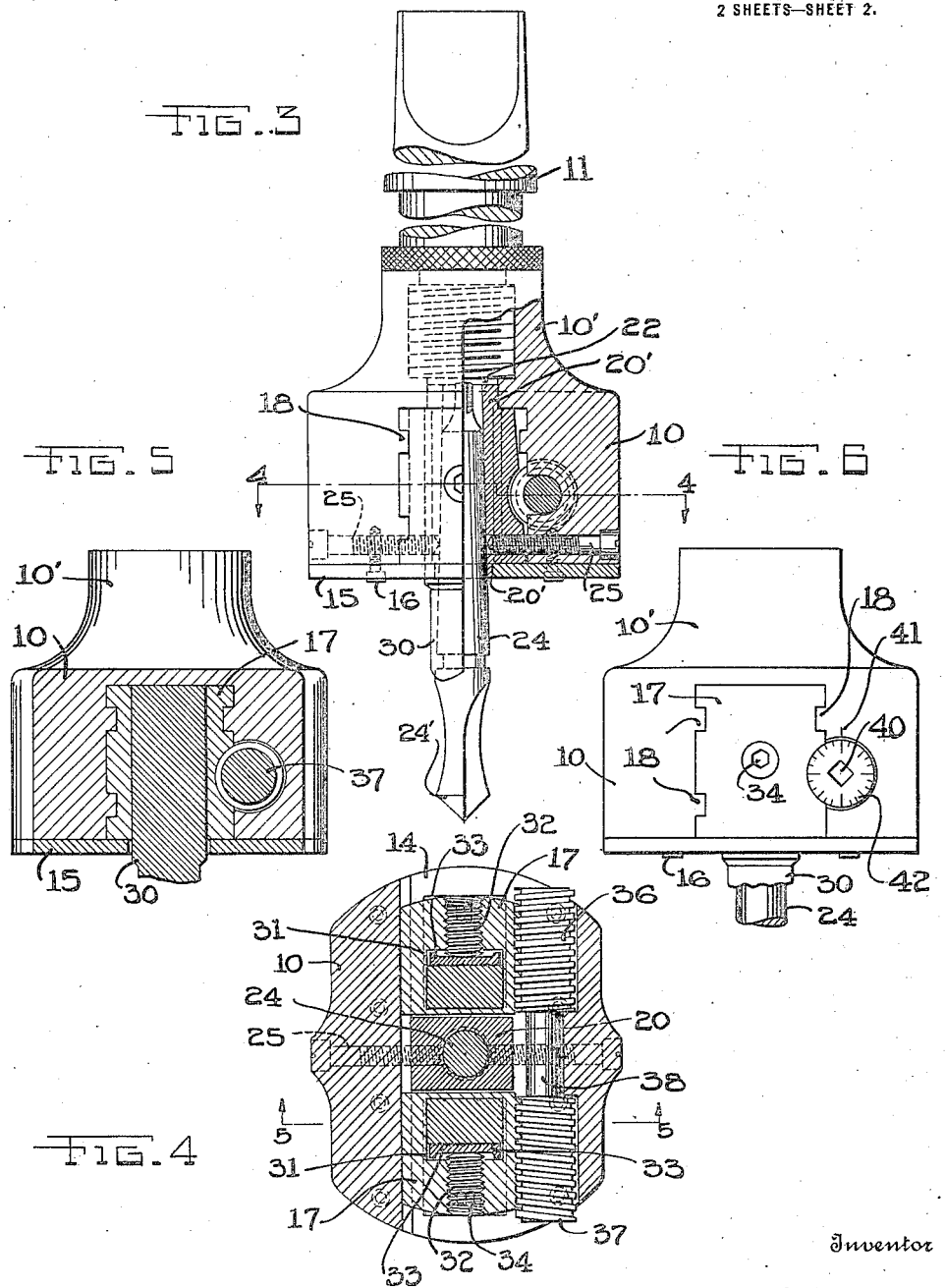

Patented Nov. 28, 1922.

1,436,974

UNITED STATES PATENT OFFICE.

WLADYSLAW MICHALCZYK, OF ELIZABETHPORT, NEW JERSEY.

BORING TOOL.

Application filed April 4, 1921. Serial No. 458,279.

*To all whom it may concern:*

Be it known that I, WLADYSLAW MICHALCZYK, a citizen of the United States, residing at Elizabethport, in the county of Union and State of New Jersey, have invented certain new and useful Improvements in Boring Tools, of which the following is a specification.

This invention relates to boring tools such as are used in lathes or drill-presses or like machines.

The invention has for an object to provide a novel form of tool whereby large holes can be readily bored in boiler plates, ship's plates or sheet or other metal generally.

More specifically speaking the invention has for an object to provide a chuck adapted to support a plurality of radially spaced boring tools.

For further comprehension of the invention, and of the objects and advantages thereof, reference will be had to the following description and accompanying drawings, and to the appended claims in which the various novel features of the invention are more particularly set forth.

Fig. 1 of the drawings is a view, partly in side elevation and partly in axial section, of a boring tool embodying the invention.

Fig. 3 is a view similar to Fig. 1 but taken at right angles to the latter.

Fig. 4 is a horizontal section on the line 4—4 of Fig. 3.

Fig. 5 is a detail transverse vertical sectional view of the chuck alone, this view being taken on the line 5—5 of Fig. 4.

Fig. 6 is a side view of the chuck alone, looking in the same direction as Fig. 3.

Figure 1:
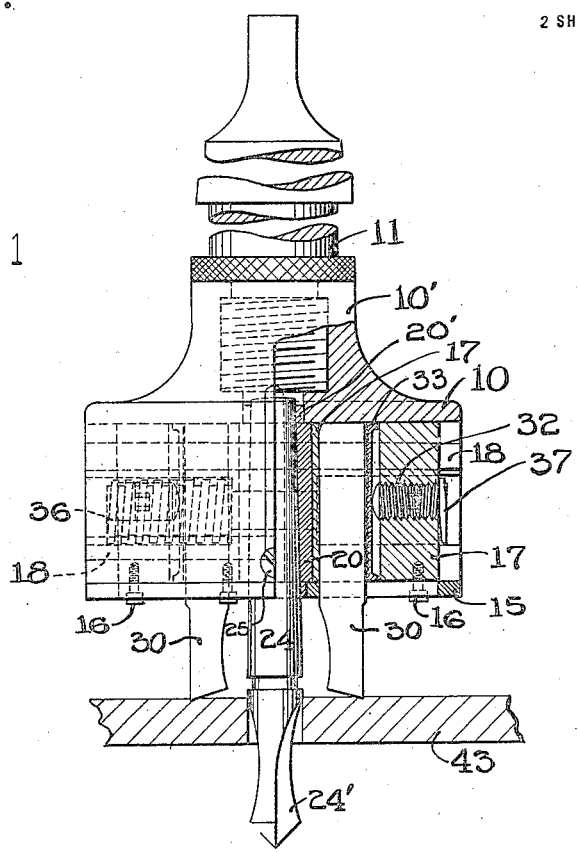
Figure 2:
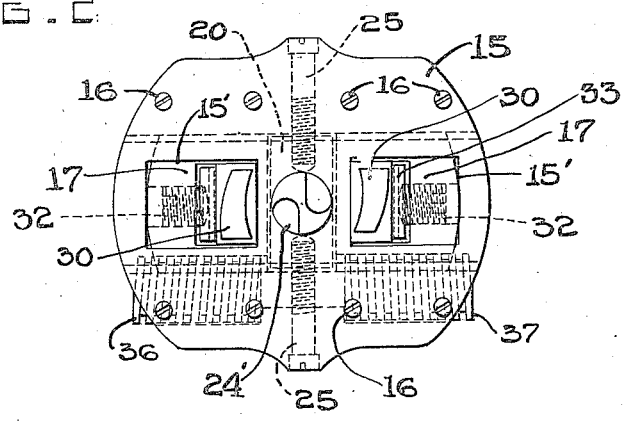
Fig. 2 is a face end view thereof.

The chuck as here embodied comprises a head 10 which may be flattened on opposite sides as shown, this head having an internally threaded neck 10' into which may be screwed one end of a tapered stem 11 whose opposite end is adapted to be engaged in the rotating element of a lathe or other machine in the usual manner.

Extending lengthwise through the head 10 is a groove 14 which is cut inwardly from the face thereof, the open side of this groove being covered by a face plate 15 secured as by screws 16 to the face of the head.

Slidably mounted in this groove 14 are a pair of similar blocks 17, the side walls of the groove 14 and the blocks having co-operating tongue and groove guide means 18 formed thereon. These blocks 17 are adapted to carry a pair of cutting tools as will be presently pointed out.

Located in the groove 14 axially of the head 10, is a centre-drill holding element 20 which is in the form of an inserted piece localized by means of diminished annular extensions 20' on opposite ends thereof which engage in a suitable aperture in the plate 15 and in a constricted interior end passage 22, in the neck 10, which communicates with the groove 14. This piece 20 presents a tapered axial opening in which may be removably secured the tapered shank of a centre-drill 24. As here shown a pair of alined screws 25 are threaded inwardly through the head 10 on opposite side thereof, these screws passing also through suitable tapped openings in the wall of the piece 20 and being adapted to bear on the shank of drill 24. The screws thus hold the drill securely in place and prevent turning movement of the piece 20.

As above stated, the blocks 17 are adapted to each hold a cutting tool, thus providing a pair of cutting tools one on each side of the centre-drill 24. These tools or cutters are shown at 30 and may have suitably formed cutting ends. The shanks of these tools are in the form of rectangular bars which are received in suitably shaped openings 31 in the blocks 17, these openings extending parallel to the axis of the chuck. The cutters 30 are secured in place by means of screws 32 which are threaded inwardly through the blocks 17 and bear against plates 33 inserted in the openings 31, these plates bearing in turn against the sides of the cutter shanks and having the faces thereof which contact with the cutter shanks roughened as indicated at 33. The screws 32 may have square sockets 34 at their outer ends to receive a suitable socket wrench for turning purposes.

The blocks 17 are arranged to have unitary adjustment in opposed directions in the grooves 14, and to be maintained at all times equidistant from the axis of the chuck. To this end an adjusting screw is carried in a lateral offset of the groove 14 and is adapted to engage the sides of the blocks, this screw comprising right and left ends, 36 and 37 respectively, spaced apart by an intermediate unthreaded portion 38 whereby the screw is swiveled in the head 10.

These right and left hand screw elements 36 and 37 are adapted to engage complementary threads in the adjacent sides of the blocks 17. The face plate 15 is cut out as indicated at 15' to provide apertures for the cutters 30 of sufficient size to allow of the desired adjustment thereof.

For rotating the adjusting screw 36, 37 square sockets such as 40 may be formed in the ends thereof to receive a suitable socket wrench, while to facilitate adjustment of the cutting tools 30 between different positions the head 10 may have formed thereon adjacent the screw ends a mark such as 41 which is adapted to cooperate with a series of marks such as 42 on the screw end.

The centre-drill 24 preferably is formed to present a cutting point 24' which projects beyond the ends of the cutters 30 so as to engage the material in advance thereof, the drill 24 presenting a smooth surface adjacent the cutters 30.

It is believed that the manner of use of my improved boring tool will be apparent from the above description. The cutters 30 are positioned with their cutting points facing outwardly and at the proper distance from one another to cut an opening of the desired size. When the tool is advanced to the work (indicated at 43 in Fig. 1) the centre-drill 24 first bores a small aperture therein and the chuck is then moved forward until the cutters 30 engage the work, the centre-drill holding the chuck properly centered as will be apparent. The cutters 30 revolve around the centre-drill 24 and cut out a hole of the required size.

Having thus described my invention what I claim as new and desire to protect by Letters Patent of the United States is as follows:

1. A boring tool comprising a head having a groove extending completely across its face, a face plate covering said groove, a centre drill holding member located in said groove and held against disengagement by said plate, a pair of adjustable cutter holding blocks in said groove between which said drill holding member is located, and a pair of screws threaded oppositely through the walls of the head and centre drill holder, for the purpose set forth.

2. A boring tool comprising a head having a centre drill holder, a pair of adjustable cutter-holding blocks on opposite sides of said centre drill holder, a screw having right and left hand portions engaging said blocks to adjust the latter oppositely in unison, said blocks being apertured to receive the shanks of the cutters, screws threaded through the walls of said blocks in the shank receiving apertures, and plates interposed between the screws and the said blocks, the faces of the plates engaging the blocks being roughened.

3. A boring tool comprising a head having a groove extending completely across its face, a removable face plate covering said groove, a centre drill holding member located in said groove and held against outward displacement by said plate, said holder having diminished annular extensions on opposite ends thereof engaging respectively in an aperture in the said plate and an interior recess in the head communicating with said groove, a pair of adjustable cutter holding blocks in said groove on opposite sides of said centre drill holder, a screw swiveled in the head and having right and left hand portions engaging the respective cutter holding blocks, and a pair of opposed screws threaded through said head and centre drill holding member transversely to the first screw.

In testimony whereof I have affixed my signature.

WLADYSLAW MICHALCZYK.